July 23, 1968 R. L. SNYDER 3,394,358

RANDOM ACCESS WIRE MEMORY

Filed March 2, 1964

7 Sheets-Sheet 1

INVENTOR.
RICHARD L. SNYDER,
BY
Walter J. Adam
ATTORNEY.

July 23, 1968 R. L. SNYDER 3,394,358

RANDOM ACCESS WIRE MEMORY

Filed March 2, 1964 7 Sheets-Sheet 2

July 23, 1968 R. L. SNYDER 3,394,358

RANDOM ACCESS WIRE MEMORY

Filed March 2, 1964 7 Sheets-Sheet 3

United States Patent Office 3,394,358

Patented July 23, 1968

3,394,358

RANDOM ACCESS WIRE MEMORY

Richard L. Snyder, Fullerton, Calif., assignor to Hughes Aircraft Company, Culver City, Calif., a corporation of Delaware Filed Mar. 2, 1964, Ser. No. 348,367
15 Claims. (Cl. 340—174)

ABSTRACT OF THE DISCLOSURE

A magnetically oriented data storage wire is provided which has a sense coil helically wound thereon. A first conductor having a plurality of U-shaped loops is provided which sets up and forms the magnetic domain cells for binary bit storage. These U-shaped loops confine the binary bit storage to predetermined areas depending upon the polarity of a biased current applied to the first conductor. A second conductor is provided and comprises a plurality of inner loops positioned within the outer loops for maintaining the magnetic state on the magnetically oriented wire by having a DC current applied thereto to establish domain walls on one side or the other of a neutral position within the domain cells and depending upon the polarity of current flow therethrough. A neutral stability is maintained at the neutral position by the opposing magnetic fields of the adjacent inner loops. The helical coil wound around the storage wire is for read out of the word formed from the binary bit in each of the cells. Readout is performed by the interrogation pulse applied to the inner loops and sensed on the output helical coils. By proper application of current to the inner loops, the domain walls established therein move in one direction from center for a binary zero or to the other for a binary one. On interrogation, the domain wall will approach the center position causing a pulse on the output of the sense coil depending upon the direction of movement thereof. If the current applied to the inner loop is of sufficient pulse width, it will completely erase the bit written therein by placing the domain wall at the center or neutral position. New data can be written into the binary bit cells by proper application of current to the inner loops and to the write current down the sense and control leads to provide a coincident current type writing technique.

This invention relates to binary memory systems and particularly to a random access memory system utilizing the principle of shifting magnetic domain walls and capable of being addressed by combining selection fields developed from unidirectional selection pulses.

Some ferromagnetic wires such as those made of nickel-iron alloy maintained under tension, for example, are sufficiently magnetically oriented along the axis thereof that the magnetic domains can be magnetized in adjacent sections of the wire with either their north or their south poles together. A movable domain wall is formed where like magnetic poles are positioned adjacent to each other. In response to an externally generated magnetic field of an intensity less than that required to form a magnetic domain, the domain wall will move along the axis in a direction determined by the polarity of the magnetic field. A memory system utilizing the principle of storing binary states by propagating domain walls to a first or a second stable position is described in patent application Ser. No. 129,936, entitled "Magnetic Domain Shifting Memory," filed July 28, 1961, by Richard L. Snyder and assigned to the same assignee as this application, now Patent No. 3,241,127. The system of the above mentioned application utilizes an elongated magnetic medium magnetically coupled with two adjacent domain forming means for establishing two magnetic domains of opposite magnetic polarity with a domain wall region therebetween. During writing, a coil magnetically coupled to the medium responds to current applied in a selected first or a second direction to move the wall from a substantially stable neutral position between the two domain forming means to a first or second end position adjacent to one of the domain forming means. Biasing means are provided to maintain the domain walls at the first or second end positions. During reading, a coil magnetically coupled to the medium propagates the wall to the center or neutral position and a signal of a first or second polarity is sensed in a coil wound around the magnetic medium. The above mentioned application teaches a word organized array utilizing linear selection, that is, switching arrangements are provided for selectively energizing lines of elements forming a word. It should be advantageous to the computer art to provide a random access memory utilizing this two-position moving domain wall principle, that may be selected with a combination of fields, that is, combining the fields developed by X and Y selection currents. Also, it would be advantageous if a system utilizing the two-position shifting domain principle were developed for reading stored information in a non-destructive manner.

It is therefore an object of this invention to provide a random access memory system that is easily constructed and requires a minimum of selection circuits for operation.

It is a further object of this invention to provide a combinatorial select memory array utilizing the principle of shifting of magnetic domains between two stable positions, in which the elements of a word are selected by combining of fields developed by unidirectional X and Y selection currents.

It is a still further object of this invention to provide a memory system utilizing the principle of storing binary information as one of two positions of a magnetic domain wall, in which the word selection operation is performed by combining of fields developed by unidirectional current pulses.

It is another object of this invention to provide a memory system utilizing the relative position of a domain wall between two domains of opposite polarity in a medium for defining the two binary states and being capable of non-destructive reading of stored binary information.

Briefly in accordance with the principles of the invention, a random access memory system is provided utilizing binary storage elements in which a magnetic domain wall is maintained during storage at a stable first or second position along a magnetic medium and in which the wall is shifted to a substantially stable central or neutral position for interrogating the stored state. The binary storage elements are formed by first and second loop or U-shaped conductors arranged between loops of segments of a domain forming conductor and substantially at right angles to a plurality of magnetic mediums each having a sense and control coil wound therearound. The first U conductors may provide selection in the Y coordinate and the second U conductor may provide selection in the X coordinate by being arranged with a plurality of connected U pieces or loops adjacent to portions of each of the first U conductors so that the fields developed by the first and second conductors combine in substantially the same direction along the medium. Segments of the plurality of magnetic wires adjacent to each of the U-shaped pieces of the second conductor provide the plurality of binary storage elements of each word position. A bias field maintains the domain walls adjacent to either a first or a second segment of the domain forming conductor during stable storage. During reading, the selected X and Y conductors develop propagating fields which are coincident at the binary elements of a selected word position to overcome the bias field and propagate the domain walls to the center positions with the stored states being sensed by the coils wound around the magnetic wire. Fields developed at the elements of words selected in only one coordinate overcome the maintaining field but are unable to propagate the domain walls. During writing, currents are passed through each of the coils in selected directions to move the domain walls from the center positions into the regions of the maintaining field which together with the writing field propagate the domain walls to the stable positions adjacent to either first or second segments of the domain forming conductors. Thus, a word is addressed for reading by energizing conductors along first and second coordinates which develop combined coincident fields in the first coordinate for cancelling the bias field and providing propagation of the domain walls at the selected word position. For reading the stored information nondestructively in accordance with the invention, the addressing fields developed by the first and second U conductors are applied to the magnetic mediums for a sufficiently short duration that the domain wall is propagated only a relatively short distance toward the center and is then returned to the stable binary position by the bias field.

The novel features of this invention, as well as the invention itself, will best be understood from the accompanying description taken in connection with the accompanying drawings, in which like characters refer to like parts, and in which.

Figures 1, 7:
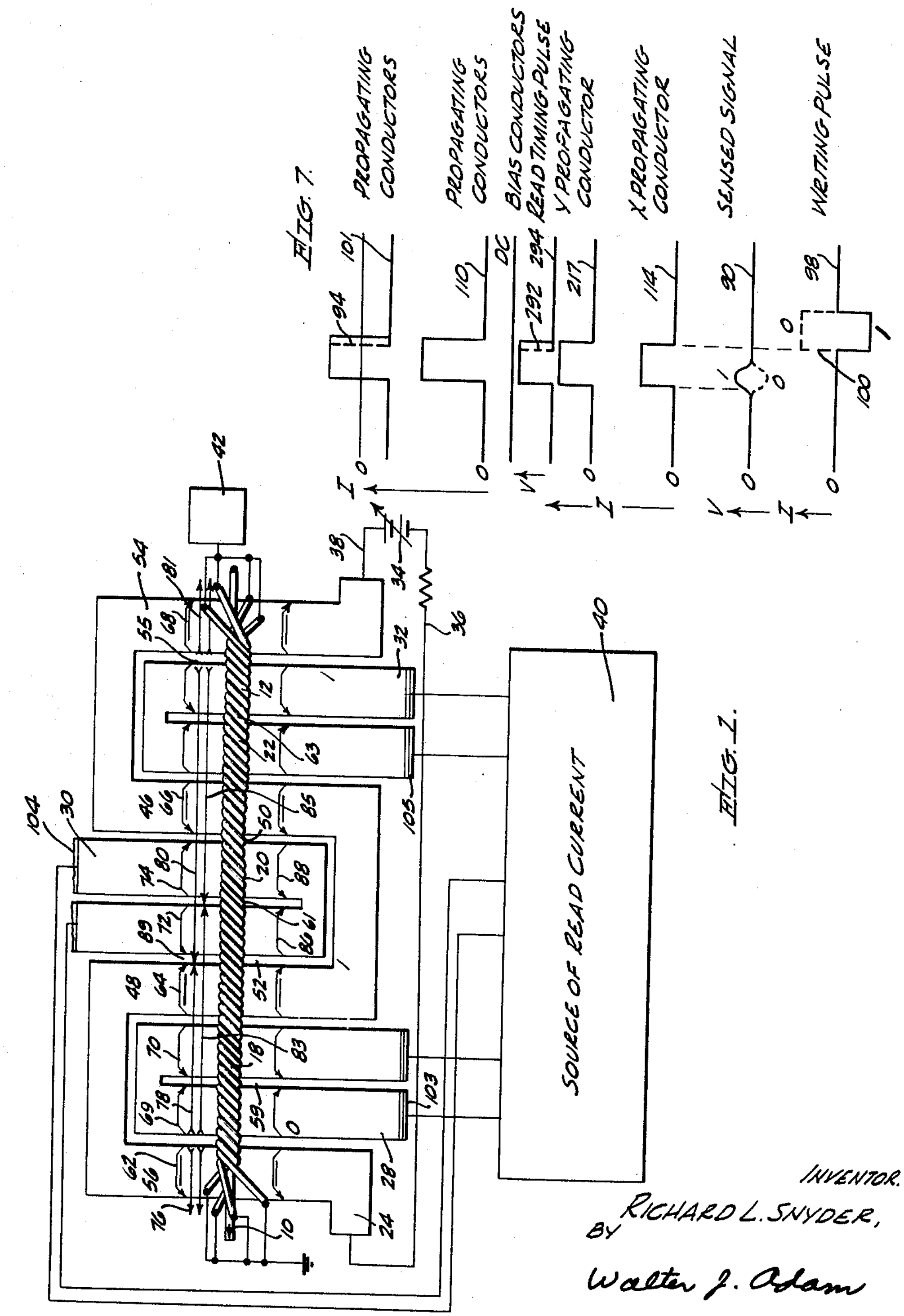
FIG. 1 is a schematic diagram of three memory cells for explaining the principle of storing binary information by moving a domain wall to a first or a second stable position in accordance with the principles of the invention.
FIG. 7 is a schematic diagram of waveforms showing voltage and current as a function of time for explaining the operation of the systems of FIGS. 1 and 2.

Referring first to FIG. 1, a moving magnetic domain wall wire memory having a storage capacity of three binary bits is shown in a word organized configuration for generally explaining the principles of the binary storage elements in accordance with the invention. A magnetic medium or wire 10 being magnetically oriented along the longitudinal axis thereof has a coil 12 wound therearound for sensing and for controlling the writing operation. The coil 12 which may be called the sense and control lead has, in some arrangements in accordance with the invention, a plurality of strands of wire wound in parallel to reduce the impedance to current flowing therethrough while at the same time providing maximum inductive coupling with the magnetic wire 10. Binary information is stored in three separate cell regions 18, 20 and 22 along the wire 10. A domain forming conductor 24, which has a plurality of loops or alternating segments at positions adjacent to and substantially at right angles to the longitudinal axis of the wire 10, establishes magnetic domains in the cells 18, 20 and 22 and establishes magnetic edge regions such as 50 and 52 for each cell. For applying a DC (direct current) field to the wire 10 to maintain a magnetic state and for applying a propagating field during reading, loops or U-shaped conductors 28, 30 and 32 are positioned adjacent to the wire 10 in the respective cells 18, 20 and 22. A propagating field is applied from each conductor to the wire 10, the two fields within each cell being of opposite magnetic polarities. The conductors such as 24, 28, 30 and 32 may be formed from etched copper sheet laminated to an insulated supporting sheet, for example.

A domain forming field and an edge region forming field may be applied from a variable source of current such as a battery 34 through a lead 36 to one end of the domain forming coil 24 and from the other end through a lead 38 to the battery 34. A source of read current 40 may be utilized to pass read currents through the loop conductors 28, 30 or 32 as well as providing DC maintaining currents thereto when write currents are not being applied. A separate pair of leads may be coupled from the source 40 to each conductor 28, 30 and 32 so that one of the respective cells 18, 20 and 22 may be selected during reading. The sense and control coil 12 may be coupled with the strands thereof in parallel to a suitable read and write system 42 at one end and to a suitable source of reference potential such as ground at the other end.

The wire 10 may, for example, be formed from suitable magnetic materials such as an iron-nickel combination. The magnetic wire may be magnetically oriented along the longitudinal axis thereof, that is, the magnetic dipoles or elements have a preferred direction of alignment along the longitudinal axis. The magnetic orientation may be provided by maintaining the wires under a stress condition such as axial tension, torsion or axial compression. The stress may in some arrangements be substantially near the yield point of the material but the invention is not limited to any particular stress condition. For some magnetic materials such as thin films, longitudinal orientation for operation of the system in accordance with the invention provided without a stress condition so that the principles of the invention are applicable to any magnetic material being sufficiently oriented to provide satisfactory operation. An oriented magnetic medium has the property that substantially more magnetomotive force must be applied thereto for establishing a magnetic domain in the direction of orientation and establishing a domain wall or the joining of two opposite magnetic poles than is required to propagate the domain wall in the direction of orientation. The magnetic wire 10 may be maintained under tension by suitable mounting structures (not shown).

In operation, sufficient direct current is first passed through the domain forming conductor 24 such as by controlling the variable battery 34 to develop magnetic fields that will insure magnetic domain formation in the wire 10 at each point adjacent to the domain forming coil 24. The magneic fields may have the polarities of the bent arrows 62, 64, 66 and 68 shown with double lines for clarity of illustration to establish, after the domains expand to form a wall therebetween, magnetic domains in the wire 10 having polarities shown by arrows 76, 78, 80 and 81. Thus, current flowing through a segment 46 of the conductor 24 establishes a magnetic domain of a first polarity and current flowing through a segment 48 of the domain forming conductor 24 establishes a magnetic domain of the opposite polarity, with the magnetic domains expanding so that a domain wall is present within the cell 20. After initially forming the magnetic domain wall, the current supplied by the battery 34 may be reduced to form magnetic boundaries such as 50 and 52 at the segments of the conductor 24 such as 46 and 48, that restrict the movement of the domain walls beyond the edge of the U-shaped conductors. Thus the length of the cell 20 is substantially between the edge regions 50 and 52. It is to be noted that the domain of the arrow 80 formed by the segment 46 extends both into the cells 20 and 22, but the domain of the arrow 81 formed by a segment 54 of the conductor 24 is of opposite polarity so a domain wall 55 is formed thereat. Also, the magnetic domain of the arrow 78 developed by the segment 48 forms a domain wall 89 in the cell 20 and extends into the cell 18 to a magnetic domain of opposite polarity of the arrow 76 developed by a segment 56, so that a domain wall or joining of two like poles of two magnetic regions is formed adjacent to the segment 56.

The cells 18, 20 and 22 have respective central or neutral positions 59, 61 and 63. In response to a direct current flowing through a selected U conductor from the source 40, propagating fields are formed in a selected cell shown by the bent arrows having single lines such as arrows 69 and 70 developed by the U conductor 28 and arrows 72 and 74 developed by the U conductor 30. These propagating fields are of a polarity to maintain the domain wall at an edge or stable position such as at the arrow 62 during binary storage. It is to be noted that because the opposite polarity maintaining fields such as shown by the arrows 72 and 74 join at the center of the cells, the domain walls have a certain degree of stability when at the central positions such as 59, 61 or 63. The domain walls have less positional stability at the center position than when at the edge positions.

The arrows 76, 78, 80 and 81 show a possible configuration of the domains and the domain walls along the wire 10 when storing the binary 0 1 1 in the respective cells 18, 20 and 22. A binary "one," for example, may be stored when the domain wall is at the left hand edge of the cell 20 and a binary "zero" may be stored when the domain wall is at the right hand edge of the cell 20. Because the domains are of opposite polarity in adjacent cells and a common writing field is utilized, the cell 18 may store a "zero" or a "one" when the wall 89 is respectively at the left or right hand edges of the cell. It is to be noted that although the fields represented by the arrows 68 and 70 and by the arrows 72 and 74 are of opposite polarity relations, the domain arrows 78 and 80 are of opposite polarity so that the maintaining field is in such a direction to propagate the domain wall to the edge of the cell region. A lower current level of a waveform 101 as shown in FIG. 7 may form the DC propagating or maintaining fields of the arrows 69, 70, 72 and 74.

For interrogating the stored information such as in cell 20, the current of the waveform 101 rises to reverse direction and develop opposite fields in the U conductor 30 shown as arrows 86 and 88. As only one cell is interrogated during a reading interval, the other propagating fields such as those of the arrows 68 and 70 remain unchanged. The fields of the arrows 86 and 88 are of such polarities to propagate the domain wall 89 from the edge position 52 toward the central position 61 as shown by arrows 83 and 85. Also, if the domain wall 81 were at the edge region 50, the field of the arrow 88 would propagate the wall toward the center position 61. It is to be noted that when interrogating any of the cells 18, 20 or 22, the propagating field is in such a direction relative to the stored domains to move the domain wall to the center position. The wall motion causes a signal of a waveform 90 (FIG. 7) to be developed in the sense and control lead 12 having a positive or negative polarity determined by the direction of motion of the wall which in turn is representative of a stored "one" or "zero" in each cell, although the direction of motion is different in adjacent cells for a "one" or a "zero." Thus, a positive output voltage of the waveform 90 may represent an interrogated "one" in the cell 20 and a negative output voltage shown dotted may represent an interrogated "zero."

If the pulse of the waveform 101 is of sufficient amplitude and time duration, the wall 89 moves to the substantially stable center position 61 and remains at that position. It is to be noted that for non-destructive reading, the time duration of the pulse of the waveform 101, while considering the amplitude, may be selected as shown by a dotted pulse 94 so that the domain wall 89 is only disturbed or moves a short distance toward the central position 61. Thus, sufficient flux movement is provided to develop a signal similar to the waveform 90 (FIG. 7) but at the termination of the pulse 94, the domain wall moves back to its stored state in response to the maintaining fields of the bent arrows 72 and 74. As an opposite polarity signal may be sensed when the domain wall moves back to the stored state, a conventional strobing arrangement (not shown) may be provided for sampling the initial movement of the wall or for sampling the movement of the wall moving back to the stable state in some arrangements.

When it is desired to write binary information into a cell, the domain wall such as 89 is propagated to the central position 61 during the reading operation, that is, the information is destructively read. For writing a "one" the sense and control circuit 42 applies a negative pulse, for example, of a waveform 98 of FIG. 7 to the sense and control conductor 12, after termination of the reading fields of the arrows 86 and 88, so that the wall 89 is propagated to the edge region 52 in response to components of fields parallel to the axis of the wire 10 having polarities similar to the arrow 72 but formed along the entire length of the magnetic wire 10. It is to be noted that although the writing field is applied to all of cells 18, 20 and 22, only the previously interrogated cell is affected by the writing field. For writing a "zero," a positive pulse 100 of the waveform 98 shown dotted, may be applied to the sense and control conductor 12 so that an opposite polarity field is applied to the wire 10 to move the wall 81 to the edge region 50. The writing pulse of the waveform 98 may be applied to the conductor 12 after, at or slightly before the fall of the reading pulse of the waveform 101 and develops a field that combines with the maintaining field in the direction of propagation. Thus a selected cell may be interrogated and written into by selecting an appropriate U or loop conductor 28, 30 or 32 for interrogation and applying a pulse of a selected polarity to the sense and control lead 12 for writing.

In another arrangement in accordance with the invention, separate U conductors such as 103, 104 and 105 shown dotted, may be provided to develop the maintaining fields of the arrows such as 72 and 74. Thus when reading a stored state, the pulse applied to the loop conductor such as 30 may rise from zero current value as shown by a waveform 110 of FIG. 7 to a value to provide reading fields sufficient both to overcome the maintaining fields and to propagate the domain wall. It is to be noted that in accordance with the principles of the invention, fields such as the maintaining bias fields and the domain forming fields may be provided by other arrangements such as permanent magnets.

Figure 3:
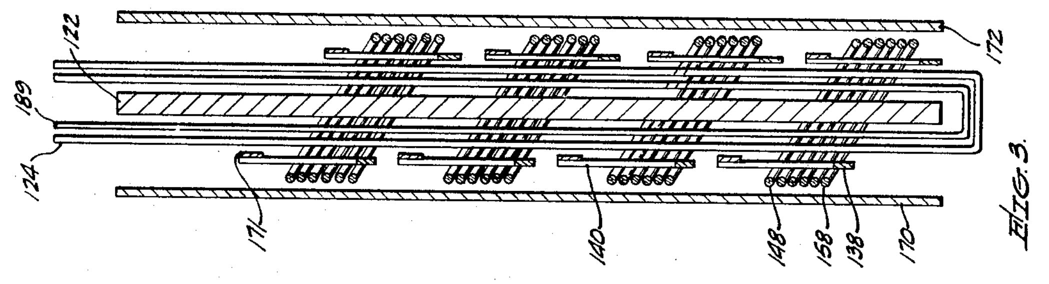
FIG. 3 is a section taken along line 3—3 of FIG. 2.
Figure 2:
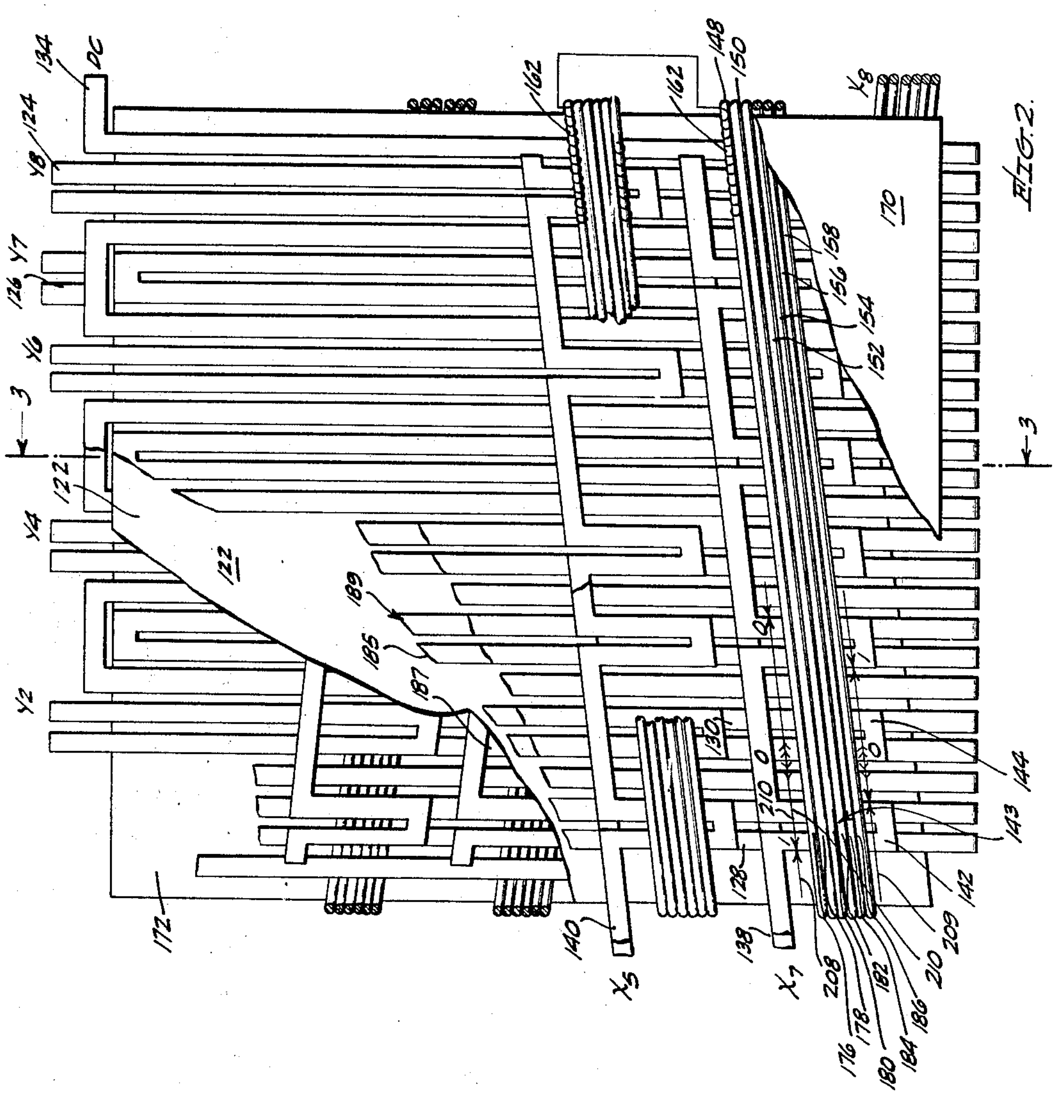
FIG. 2 is a schematic side view of a memory array partially broken away for providing selection of word elements in first and second coordinate directions by combining coincident fields in a single coordinate direction in accordance with the principles of the invention.

Referring now to FIG. 2 and to the sectional view of FIG. 3, the combinatorial select memory array for switchin with a combination of fields while only requiring unidirectional selection currents may be mounted on a substrate plate 122 which, for example, may be of a suitable material such as Bakelite, aluminum or glass. As is well known in the art, a combinatorial select memory is one in which the elements that store the bits of a single word are affected by the application of two signals, one signal usually described as actuating an X coordinate conductor and the other signal as actuating a Y conductor. Both the X and Y signals affect not only the subject word position but, in a partial sense, affects or partially disturbs all other word positions along the corresponding coordinates. Where the X and Y signals coincide at the subject word position, the sum of the two signals which are always additive have a full effect of disturbing the selected word position to perform a read operation and sometimes a write operation. To be effective, the word elements must have sufficiently non linear characteristics in response to the X or Y signals that the partial disturbance along each coordinate causes a negligible change in the state of the bit storing elements at the unselected but disturbed positions.

Positioned on each side of the plate 122 are groups of Y conductor loops or U-shaped conductors such as 124, 126, 128 and 130 with a suitable insulation such as shellac or Mylar (not shown) on the surfaces thereof. The domain forming conductors such as 124 and 126 are bent so as to be positioned on both sides of the plate 122. A domain forming coil 134 is positioned and bent at the bottom of the plate 172 to provide loops or an alternating segment adjacent to each of the Y coordinate loop conductors such as 124, 126, 128 and 130. To provide selection in the X direction, X conductors such as 138 and 140 are positioned adjacent to the domain forming conductor 134 with loop sections or U sections such as 142 and 144 coincident with and adjacent to the corresponding Y coordinate loop conductors such as 128 and 130. The X conductors such as 138 and 140 have a skewed configuration across the horizontal dimension of the array of FIG. 2 to correspond to the direction of the helix formed by winding magnetic wires around the structure. The memory array which has four X conductors such as 138 and 140 on each side of the mounting structure 122 and has eight U sections or loop sections such as 142 and 144 in each Y conductor, stores sixty-four words in the illustrated example. As may be best seen in FIG. 3, the X conductor loops are formed of two layers bent at positions such as 171 so as to be an equal distance from the magnetic wires such as 148. On each side of the mounting plate 122, a bias or maintaining conductor section 185 and 187 of a maintaining conductor 189 is provided having U sections or loops in the Y direction coincident with the Y conductors.

To provide six binary bits for each word, six separate magnetic wires 148, 150, 152, 154, 156 and 158 are wound around the structure so that six segments of the magnetic wires are adjacent to the loop segments such as 142 or 144 of each X conductor such as 138. A sense and control coil such as 162 is wound around each of the magnetic wires and may each be formed of a plurality of parallel wires similar to that shown in FIG. 1. It is to be noted that the six magnetic wires and the six sense and control conductors may each be continuous for the entire memory array. In order that the magnetic wires 148, 150, 152, 154, 156 and 158 are maintained under sufficient axial tension, for example, to provide the desired longitudinal orientation as previously discussed, they may be attached to the mounting plate 122 by suitable means which are not shown for convenience of illustration. The winding of the magnetic wires in the array in accordance with the invention may be provided by winding machines such as properly controlled lathe arrangements, for example.

In order to maintain the magnetic domain forming and propagating fields within the array, shields such as 170 and 172 of a suitable material such as aluminum may be positioned on each side of the array. Thus, it can be seen that at each U section of the X conductor such as the section 142, six storage cells such as 176, 178, 180, 182, 184 and 186 of a word position 143 are provided to be coincidentally read in response to combined half fields resulting from applying selection currents in the X and Y coordinate directions. Binary information is separately written into the storage cells such as 176 and 178 by applying selected writing pulses to the six sense and control leads such as 162, coordinate selection not being required during writing. Although the array is shown for storing words of six binary bits, the words may be any desired number of binary bits in accordance with the principles of the invention by changing the number of loops of the magnetic wires at each X loop section such as 142.

Figure 4:
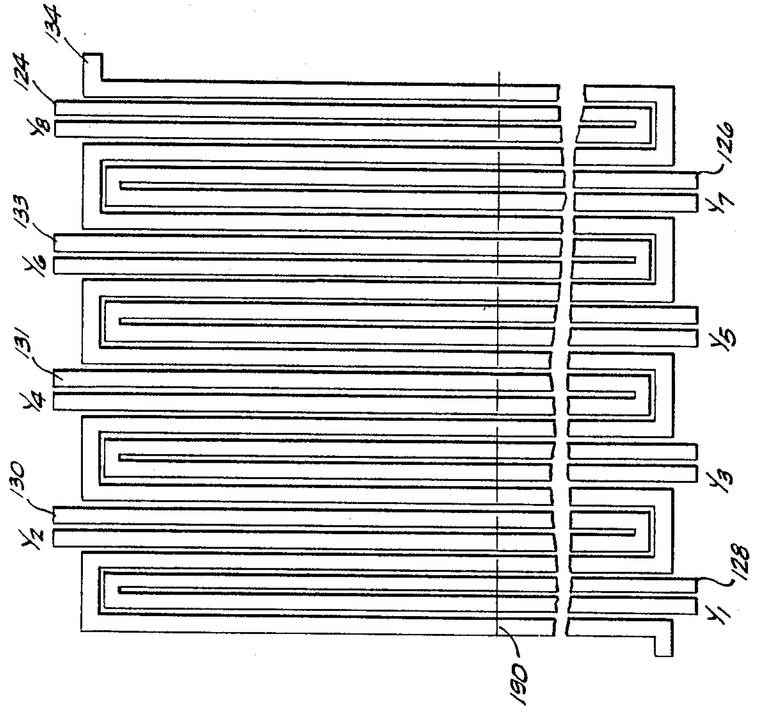
FIG. 4 is a schematic side view of the U-shaped conductor or loop conductors utilized for half selection of word elements in the Y coordinate direction in the system of FIG. 2.

Referring now to FIG. 4, the domain forming coil 134 is shown in a position relative to the Y conductor loops such as 124, 128 and 130 prior to mounting on the substrate plate 122. The domain forming coil 134 has alternate segments so that domain walls are formed in each cell by joining of two like poles, with the domain walls alternately formed from the joining of two north poles or two south poles in adjacent word elements. The domain forming coil 134 and the Y conductor arrangement may be folded at a suitable position such as 190 over the substrate plate 122 so that all of the terminals are at one end of the array. It is to be noted that the Y conductors are given column numbers $Y_1$ to $Y_8$ in correspondence with the column numbers shown in the completed array of FIG. 2. For mounting the array of FIG. 4, the conductors which may be etched copper sheet may be mounted on a suitable non-conductive material such as Mylar to maintain their desired relative positions.

Figure 5:
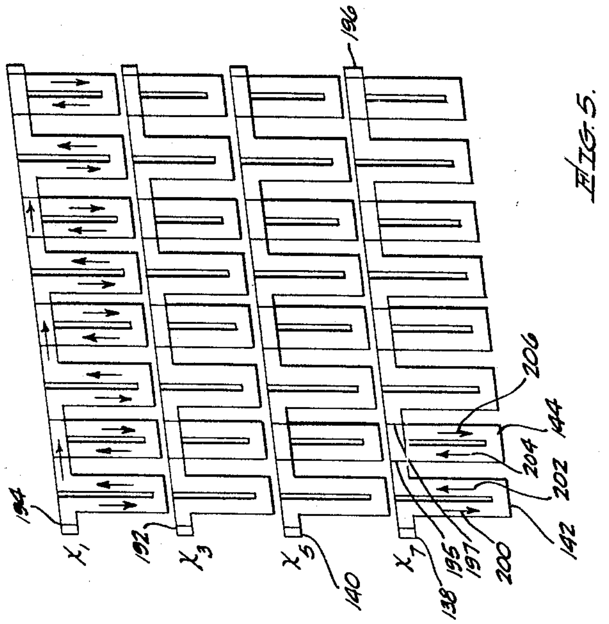
FIG. 5 is a schematic side view of the U or loop conductors having a plurality of interconnected U segments or loops for developing fields in the Y coordinate direction for half selection of word elements in the X coordinate direction in the system of FIG. 2.

The arrangement of FIG. 5 shows the U shaped conductors in the X coordinate as utilized on one side of the mounting plate 122. The arrangement includes four X conductors 138, 140, 192 and 194 which are provided with respective designations $X_7$, $X_5$, $X_3$ and $X_1$ in correspondence with the completed array of FIG. 2. It is to be noted that the X conductors such as 138 are formed from a configuration twice the length before folding at a position 196 so that the proper current directions are provided for reading as shown by arrows 200, 202, 204 and 206 being opposite in each adjacent U segment such as 142 and 144. The X conductors such as 138 may be formed with bends such as 195 and 197 so that the X conductor loop sections such as 142 and 144 are in a single flat plane. The completed arrangement of FIG. 5 after folding may be mounted on a suitable non-conductive material such as Mylar for maintaining their relative positions while being mounted in the completed array of FIG. 2.

Figure 6:
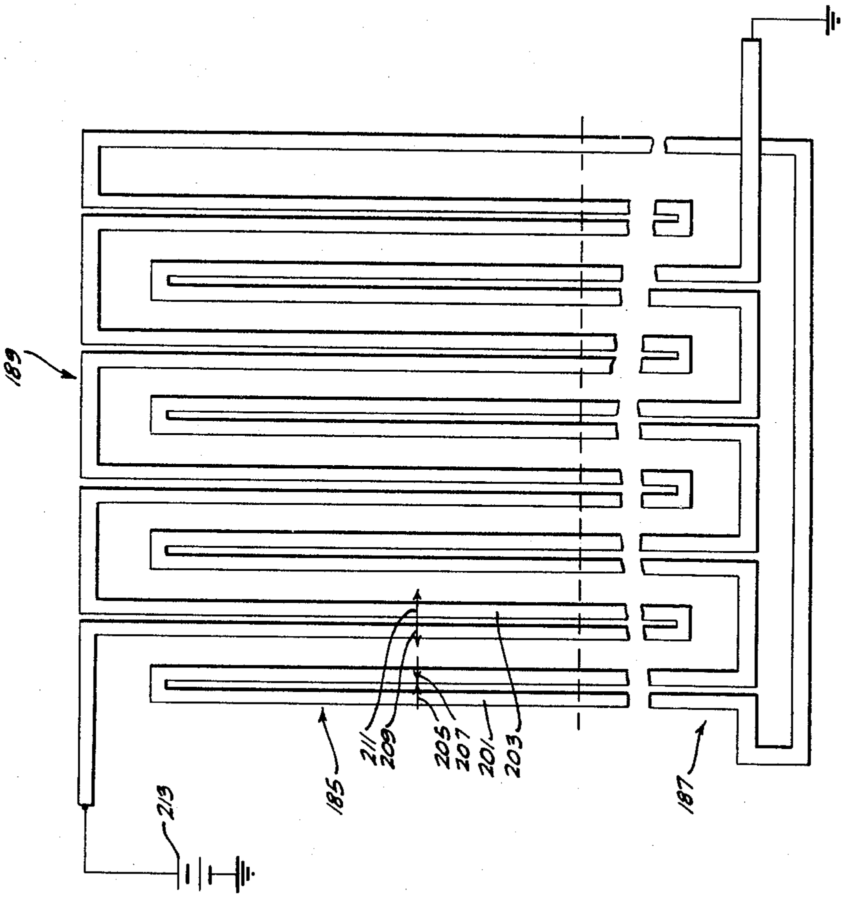
FIG. 6 is a schematic side view of a conductor that may be utilized to form the maintaining bias field in the system of FIG. 2 in accordance with the invention.

Referring now to FIG. 6, the maintaining conductor 189 that allows selection current pulses rising from zero current to be utilized, is shown with a plurality of loops or U sections such as 201 and 203. The conductor 189 may be formed of etched copper sheets with a suitable insulating sheet (not shown) of non-conductive material on both sides thereof. Because the domain walls in each cell position are formed of opposite magnetic polarity regions, that is, the joining of two north poles or of two south poles, the loops are connected so that maintaining fields of opposite polarity are formed in adjacent loops, as shown by arrows 205 and 207 in the loop 201 and arrows 209 and 211 in the loop 203. The maintaining fields may be formed in response to a suitable source of DC current such as a battery 213 coupled across the ends of the conductor 189.

Referring now principally to FIGS. 2 and 7, the random access selection operation of combining of two fields in one dimension, which fields may each be of one-half amplitude required to overcome the maintaining field and propagate the domain wall to the center position, will be explained in further detail. The cells 176, 178, 180, 182, 184 and 186 may be storing a 1 1 1 1 1 0 combination as indicated by the positions of the domain walls of arrows such as 208 and 210 and arrows such as 209 and 211 in the respective magnetic wires 148 and 158. The domain walls are positioned at either the left or right hand sides of the segments such as 142 respectively representing a stored "one" or "zero." Because the domains are of opposite polarity in adjacent word positions such as at the loops 142 and 144 and the same polarity writing pulse is utilized in all word positions for writing a "one" for example, a "one" is represented by the right hand position at the loop 144 and alternating positions at each adjacent loop. The fields developed by the domain forming conductor 134 and by the maintaining fields developed by the DC current passing through the maintaining conductor arrangement 189 maintain the domain walls in position. It is to be noted that although the maintaining fields insure the absence of wall motion from the stable positions, the domain wall remains at the stable position in the absence of the maintaining field and other applied fields. However, during reading, the use of a maintaining field is required to prevent movement of domain walls at unselected word positions along energized conductors. Also during writing, the maintaining fields prevent movement of domain walls responding to writing fields, which writing fields are of lesser magnetic intensity than the maintaining fields.

For a reading operation, a positive pulse of a waveform 217 is applied to a selected Y conductor such as 128 so that a reading field is developed adjacent to the loops of the X conductors such as 138 substantially parallel to the magnetic wires such as 148 and 158. At the same time, a positive pulse of a waveform 114 is applied to a selected X conductor such as 138 so that a reading field is developed in each of the U sections such as 142 and 144 parallel to the magnetic wires such as 148. The fields developed by the X and Y conductors only combine at the selected word position 143 to both overcome the maintaining field and propagate the domain walls to the central or neutral position of each of the six cells. In other word positions along the selected conductors 128 and 138, the maintaining field is overcome by the half amplitude fields but the domain walls are not disturbed. The movement of the domain walls induces positive voltages of the waveform 90 in the sense and control conductors such as 162 wound around the wires of the cells 176, 178, 180, 182 and 184 and induces a negative voltage of the waveform 90 in the sense and control conductor wound around the magnetic wire 158 of the cell 186. This sensed signal is developed for either destructive reading when the domain walls move to the center positions or for non-destructive reading when the domain walls move only a portion of the distance to the central position and are then returned to the stable binary state by the magnetic force of the maintaining field. It is to be noted that during non-destructive reading, an opposite polarity pulse (not shown) may be developed on the waveform 190 when the wall returns to its stable position but a strobing arrangement may be utilized to sample the first pulse, for example. Thus, coordinate selection is provided with the half selection fields combining in one coordinate direction at only a selected word position such as 143. Although the maintaining field is overcome in all word positions along the Y conductor 128 and along the X conductor 138, the half amplitude fields are not each of sufficient intensity to propagate the domain walls. It is to be noted that if the maintaining field is formed in accordance with the invention by passing DC current through the Y conductor, for example, in the opposite direction from the selection current as indicated by the waveform 101, and reading is performed by removing the current from a selected Y conductor, the X selection pulses have amplitudes provided so that only the selected word position at which the maintaining field is removed is subject to a reading field sufficient to move the domain walls.

During writing, after the six domain walls in the cells of the selected word are propagated to the center or neutral positions and the combination of reading fields are terminated, a "one" or a "zero" may be selectively written into the cells. If a negative pulse of the waveform 98 is applied to the sense and control conductor such as 162, the domain wall is moved to the "one" position (left hand position at the loop 142 and the right hand position for the loop 144), and if a positive pulse such as 100 is applied to the sense and control conductor the domain wall is moved to the "zero" position (right hand position for the loop 142 and the left hand position for the loop 144). The system illustrated operates with a positive sensed signal representing a "one" and a negative writing pulse recording a "one" in all word positions and cells. It is to be noted that although the writing field is applied to the magnetic wires at all word positions, only the domain walls at the previously interrogated cells are affected. Thus, separate pulses are applied to each of the sense and control conductors such as 162 so that a desired word of six binary bits is recorded in the selected word position such as 143. Because the cells at only the interrogated word position have domain walls in the center positions, only these cells respond to the writing fields. As the binary cells of only one word position are selected for reading and writing at one time, the six sense and control conductors such as 162 may each be continuous for the entire array.

Figure 8:
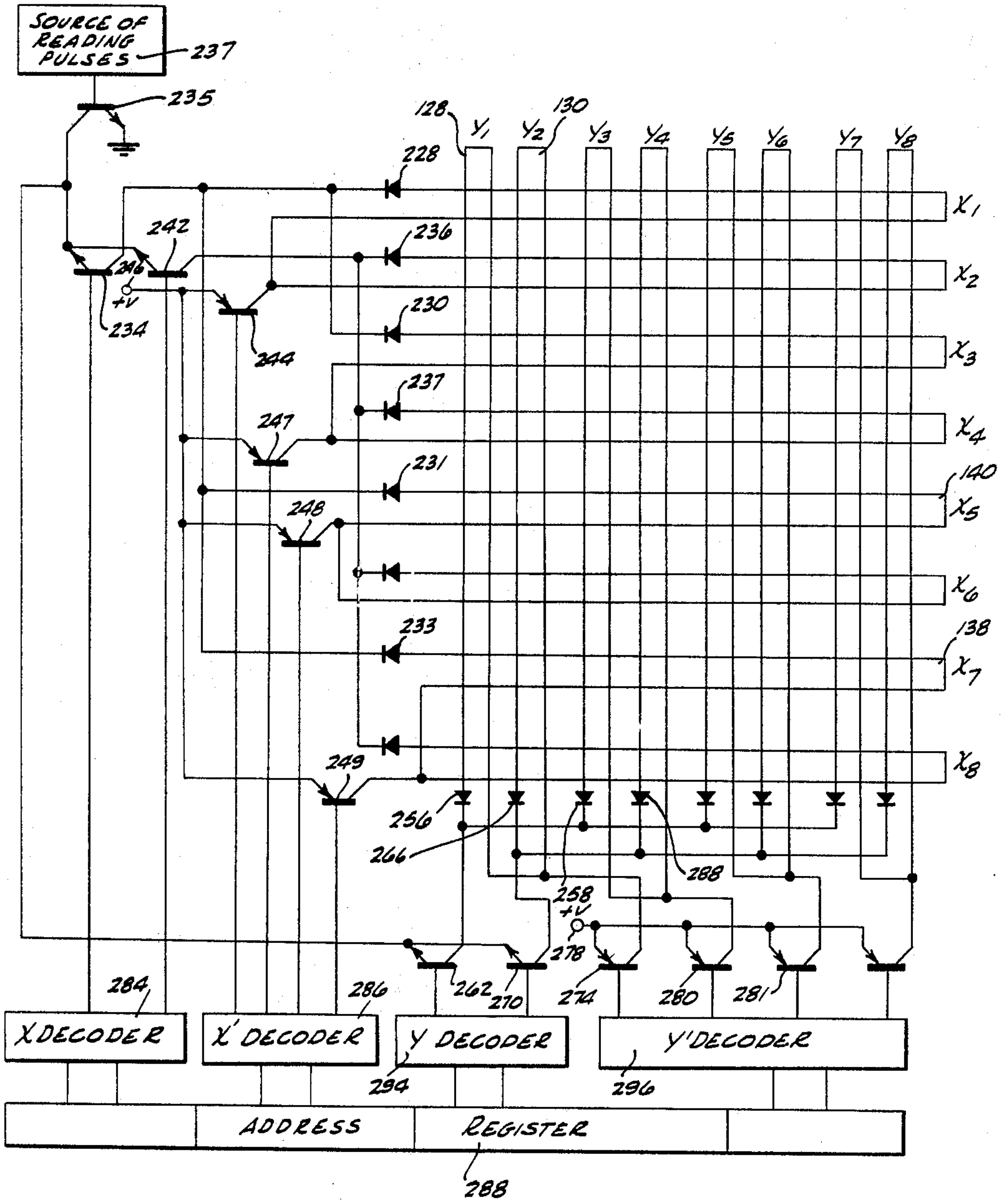
FIG. 8 is a schematic circuit and block diagram showing an X and Y addressing arrangement in accordance with the principles of the invention.

Referring now to the circuit and block diagram of FIG. 8, an arrangement is shown for the half field selection operation that may be utilized with the array of FIG. 2 when developing the bias field with the maintaining bias conductor 189. It is to be noted that if bidirectional current is provided in accordance with the principles of the invention for the X or Y conductors or if selection is performed by removing the DC current from a conductor in one coordinate and applying a large pulse through a conductor in the other coordinate, rather than providing the separate conductor 189, a similar selection arrangement may be utilized except with a source provided for applying a bias current in directions opposite to that of the selection currents. In the arrangement of FIG. 8 in accordance with the invention, only unidirectional addressing currents are required through the Y conductors such as 124, 126 and 130 and the X conductors such as 138 and 140. As may be seen in FIG. 2, all of the Y conductors are utilized at word positions on both sides of the array, the conductors $Y_2$, $Y_4$, $Y_6$ and $Y_8$ are utilized on the front side of the array and the conductors $Y_1$, $Y_3$, $Y_5$ and $Y_7$ are utilized on the opposite side of the array. The conductors $X_1$, $X_3$, $X_5$ and $X_7$ each have one end coupled through the anode to cathode paths of respective diodes 228, 230, 231 and 233 to the collector of an npn type transistor 234 and the conductors $X_2$, $X_4$, $X_6$ and $X_8$ each have one end coupled through the anode to cathode paths of diodes such as 236 and 237 to the collector of an npn transistor 242. The other ends of the conductors $X_1$ and $X_2$ are coupled to the collector of a pnp type transistor 224 having an emitter coupled to a suitable positive source of potential such as a terminal 246. Similarly, the other ends of adjacent pairs of X conductors such as $X_3$ and $X_4$ are coupled to the collector of pnp type transistors 247, 248 and 249 each having an emitter coupled to a suitable source of positive potential such as the terminal 246. A read transistor 235 of the npn type has a collector coupled to the emitters of the transistors 234 and 242, an emitter coupled to a suitable source of reference potential such as ground and a base coupled to a source 237 of read timing pulses.

In a similar manner, one end of the conductors $Y_1$, $Y_3$, $Y_5$ and $Y_7$ are coupled through the anode to cathode paths of diodes such as 256 and 258 to the collector of an npn type transistor 262 and one end of the conductors $Y_2$, $Y_4$, $Y_6$ and $Y_8$ are coupled through the anode to cathode paths of diodes such as 266 and 268 to the collector of an npn type transistor 270. The other ends of the adjacent pairs of Y conductors such as $Y_1$ and $Y_2$, $Y_3$ and $Y_4$, $Y_5$ and $Y_6$, and $Y_7$ and $Y_8$ are coupled to collectors of respective pnp type transistors 274, 280, 281 and 283 each having an emitter coupled to a suitable positive source of potential such as a terminal 278. The emitters of the transistors 262 and 270 are coupled to the collector of the transistor 235.

For selection in the X direction, an X decoder 284 responds to pulses applied from an address register 288 to apply a positive potential to the base of one of the transistors 234 and 242. An X′ decoder 286 also responds to the address register 288 to apply a negative pulse to the base of one of the transistors 244, 247, 248 or 249. Thus a specific X conductor is selected and in response to a read pulse of a waveform 294 (FIG. 7) developed by the source 237, a current pulse of the waveform 114 is passed through the selected X conductor. As a result, an X reading field is applied to the cells of the selected word elements, and to all of the word elements adjacent to the selected word conductor, in a direction parallel to the lonigtudinal axis of the magnetic wires. It is to be noted that a pulse 292 of the waveform 294 which energizes the transistor 235 may be utilized of a shorter time duration by controlling the source 237 when non-destructive reading is desired.

At the same time that the X conductor is selected, a Y decoder 294 and a Y′ decoder 296 apply respective positive and negative pulses to one of the transistors 262 and 270 and to one of the transistors 274, 280, 281 and 283 to select a Y conductor. In response to the read pulse of the waveform 294 (or 292 for non-destructive reading) a current pulse of the waveform 217 flows through a selected Y conductor. As a result, X and Y reading fields are applied in combination to the six cells of the selected word to overcome the maintaining field and move the six domain walls to the central position. Thus in the system of the invention, reading may be performed by combining two fields developed by unidirectional current pulses.

Figure 9:
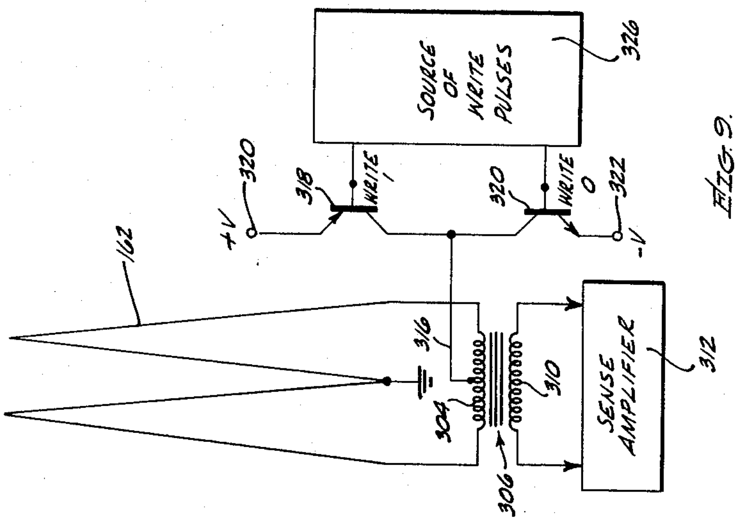
FIG. 9 is a schematic circuit and block diagram showing a read-write arrangement in accordance with the principles of the invention.

Referring now to FIG. 9, which shows a sensing and writing circuit for one of the six sense and control conductors of FIG. 2, the sense coil 162 is grounded at the center and coupled at the other two ends to a winding 304 of a transformer 306. The helical sense and control wires may be cut after the array of FIG. 2 is completed by winding the magnetic wires therearound and the ends connected so that all of the conductors for the same bit position of all word positions are connected in series and grounded at the center. This series arrangement is indicated for the sense and control conductor 162 in FIG. 2. A secondary winding 310 of the transformer 306 is coupled to a sense amplifier 312 to apply signals thereto having polarities dependent on the polarity of the sensed signal. For writing into the interrogated cell with a current pulse of the waveform 98 (FIG. 7), the winding 304 has a center tap coupled through a lead 316 to both the collector of a pnp type transistor 318 and the collector an npn type transistor 320. The emitters of the transistors 318 and 320 may be respectively coupled to suitable sources of potential such as a positive terminal 320 and a negative terminal 322. A source of write pulses 326 is coupled to the bases of the transistors 318 and 320 to apply positive or negative pulses thereto so that either negative or positive current pulses of the waveform 98 (FIG. 7) are applied through the sense and control conductor 162 for respectively recording a "one" or a "zero" in the corresponding bit position of the selected word. As discussed above, a similar arrangement may be utilized for each of the six sense and control leads of the array of FIG. 2.

Figures 10, 11:
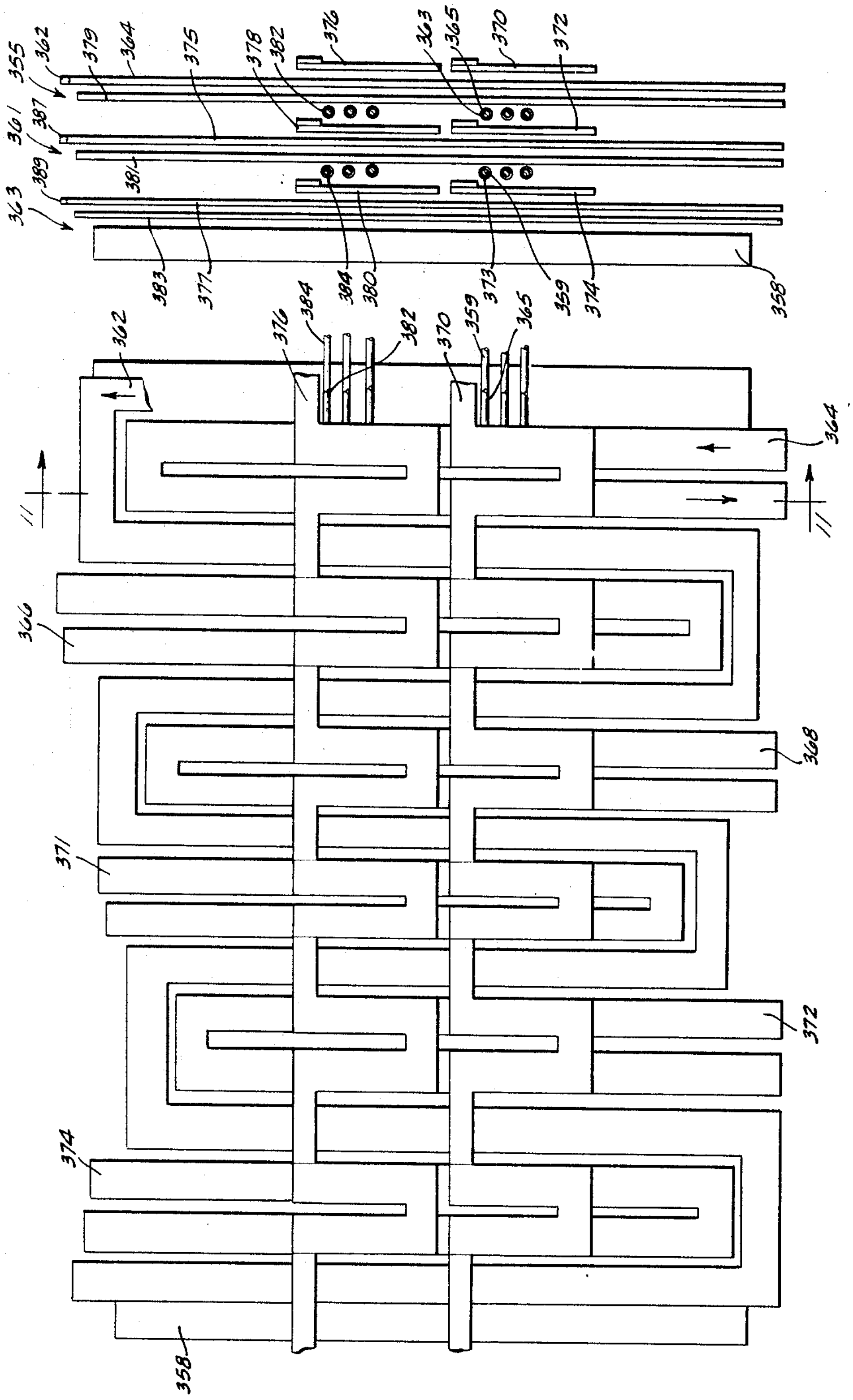
FIG. 10 is a schematic side view of a memory array showing an arrangement of utilizing complementary magnetic wires and developing substantially uniform selection fields in accordance with the principles of the invention.
FIG. 11 is a sectional view taken at line 11—11 of FIG. 10.

Referring now to FIG. 10 and the sectional view of FIG. 11, a memory system in accordance with the principles of the invention will be explained utilizing complementary magetic wires for storing the domains that provide the movable domain walls. It is to be noted that the system of FIG. 10 shows a memory system on only one side of a plate 358 but that the principles in accordance with the invention are applicable to positioning the storage structure on both sides of the mounting plate as explained relative to FIG. 2. As may be seen in FIG. 11, the memory array includes three identical layers 355, 361 and 363 each including a domain forming conductor, Y loop conductors, maintaining conductors, and X loop conductors, each X loop conductor having a loop for each word position in the Y dimension. Magnetic wires which may be maintained under tension such as wires 365 and 367 are positioned between adjacent X conductors 370, 372 and 374. Each magnetic wire has a sense and control conductor such as 373 wound therearound. For convenience of illustration each word arrangement is adjacent to three wires such as 365 and three complementary wires such as 359 for storing three binary bits per word. Also, X conductors 376, 378 and 380 are shown enclosing magnetic wires such as 382 and 384 and may be similar to the arrangement of FIG. 5 having two portions bent adjacent to each other for providing proper current directions. It is to be noted that for convenience of illustration only two elevations of X conductors are shown but that any desired number may be utilized in accordance with the principles of the invention. Maintaining bias conductors 379, 381 and 383 are provided in the respective layers 355, 361 and 363, positioned in each layer similar to the arrangement of FIG. 2.

A domain forming conductor such as 362 is provided at each layer such as 355 with alternating segments or loops and Y loop conductors such as 364, 366, 368, 371, 372 and 374 positioned between adjacent segments of the domain forming conductor 362 similar to the arrangement of FIG. 2. In the layers 361 and 363, respective Y conductors 375 and 377 and respective domain forming conductors 387 and 389 are provided as shown at the broken section of FIG. 11. The loops of the X conductors 370, 372 and 374 as well as the X conductors 376, 378 and 380 are coincident and adjacent to the corresponding Y conductors such as 364, 366, 368, 371, 372 and 374 similar to the arrangement of FIG. 2. As will be explained subsequently, the magnetic wires such as 365 and 359 are subjected to a substantially uniform field by the arrangement of FIG. 11 so that small variations of position of the wires either in a vertical dimension or in a horizontal dimension relative to the X conductors have substantially no effect on the reliability of the operation. The use of complementary magnetic wires in accordance with the invention provides substantially complete cancellation of external fields from the poles at the domain walls and allows wires to be positioned relatively close together to form a high density memory.

Figure 12:
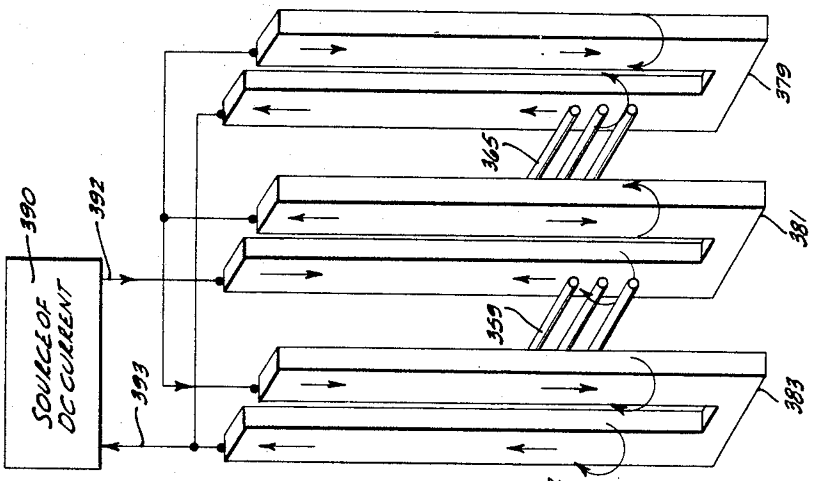
FIG. 12 is a schematic perspective diagram showing one set of conductors in the memory array of FIG. 10 for explaining the directions of currents applied thereto.

Referring now also to the schematic diagram of FIG. 12, current is applied to the maintaining conductors such as 379, 381 and 383, to the Y coordinate U conductors such as 364, 375 and 377, and to the X loop conductors such as 370, 372 and 374 so that all of the current flows through the center conductor loop and one-half of the current is returned through each of the outer two conductor loops. Because the relative directions of the current paths are similar for the maintaining conductors, the X loop conductors and the Y loop conductors, except having directions to provide the required polarity relations, the operation will be explained relative to the maintaining conductors 379, 381 and 383 for convenience of illustration. In response to current from a source 390 which is a D.C. source for the maintaining conductors, current flows through a lead 392 through the maintaining conductor 381 of the layer 361 and divides to flow equally through the conductors 379 and 383 of the respective layers 355 and 363 and through a lead 393 to the source 390. For the X loop conductors and the Y loop conductors, the source 390 is a suitably timed source of current pulses as explained relative to FIG. 7. Because the group of magnetic wires such as those including wires 365 and 359 are enclosed between the inner conductor 381 and the outer conductors 379 and 383, fields are applied thereto of substantially uniform and equal magnitude and of opposite polarity at the different vertical groups of complementary wires.

Figure 13:
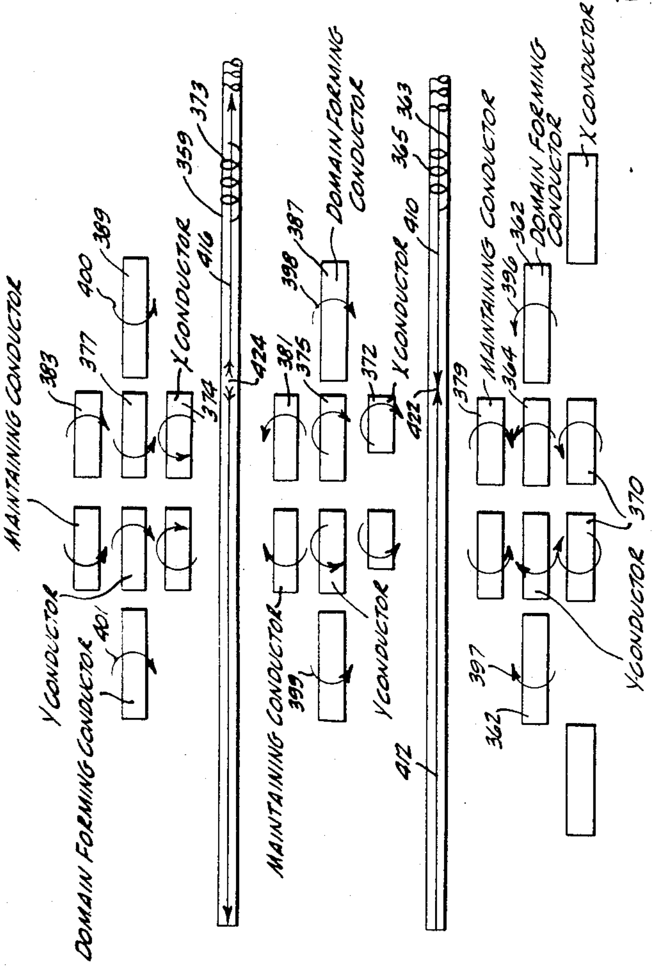
FIG. 13 is a diagrammatic view of the conductors at a word position in the array of FIG. 10 utilizing complementary wires for further explaining the operation thereof.

Referring now to FIG. 13, a schematic arrangement is shown to illustrate the polarities of the fields developed by the different conductors when utilizing the complementary magnetic wires of the memory array in FIG. 10. The domain forming conductors 362, 387 and 389 form fields indicated by arrows 396 and 397, 398 and 399, 400 and 401 which have polarities to form magnetic domains 410 and 412 in the wires such as 365 and domains 416 and 418 in the wires such as 359. Thus it can be seen that the domains in the wires 365 and 359 are complementary so that domain walls 422 and 424 have opposite polarity relations. It is to be noted that the domain walls 422 and 424, which for illustrative purposes are at a "zero" position, are always both maintained at that similar position or both at a "one" position. The maintaining conductors 379, 381 and 383 have current passing therethrough so that the fields have a polarity relation that is summed at each of the wires 365 and 359. The Y loop conductors 364, 375 and 377 which develop fields of opposite polarity from the fields of corresponding maintaining conductors 379, 381 and 383, have polarity relations so that the fields are summed at each of the wires 365 and 359. Also, the X loop conductors 370, 372 and 374 develop fields having polarity relations similar to the respectively adjacent Y conductors 364, 375 and 377, which fields are summed at each of the adjacent magnetic wires 365 and 359. The fields developed by each X and conductor, Y conductor and maintaining conductors are developed by a full amplitude current passing through the central level or layer 361 and half the amplitude of current passing in the opposite direction through the corresponding conductors of each of the two outside layers 355 and 363. Each set of fields such as the domain forming field, the X conductor field, the Y conductor field and the maintaining field are substantially uniform and consistent between the conductors and substantially retained between the conductors. The field between any two of the similar conductors which carry current in opposite directions is thus substantially uniform everywhere therebetween except near the ends. This high degree of field uniformity results in reliable performance even though variations in mechanical dimensions are developed during the manufacturing operation.

As explained relative to FIGS. 1 and 2, the fields shown in FIG. 13 are developed in each word position by current passing through the domain forming conductor, the X conductor and the Y conductor in directions to develop fields opposite from the field developed by currents flowing through the maintaining conductors. The sense and control coils such as 363 and 373 on a complementary pair of wires may be connected in either series or parallel in accordance with the invention. Similar to the arrangement of FIG. 2, the sense and control wires for the same bit position of each row of words may be connected in common by suitable external connections provided by cutting the helical wire. It is to be noted that the arrangement of FIG. 11 may be constructed in layers by first winding the magnetic wires over the layer 363 and then over the layer 361. In selecting a word position for reading in accordance with the invention, an X and a Y field may be developed each having magnetomotive force in excess of the maintaining field without being sufficient to move the unselected domain walls. The reading field at the selected word position is sufficient to provide domain propagation but insufficient to establish or nucleate a magnetic domain. The complementary wire arrangement of FIG. 10 may be operated with either destructive or non-destructive reading in accordance with the principles of the invention. It is to be noted that in the arrangements of FIGS. 1, 2 and 10 in accordance with the invention, suitable insulating sheets or material is provided to prevent undesired conduction between adjacent conductive elements.

As an example, the system in accordance with the invention may utilize a hard drawn 72 percent nickel and 28 percent iron alloy wire maintained under tension. The minimum field that will propagate a domain wall is between 3 and 3.5 oersteds for this wire. The minimum switching or nucleating field for establishing a magnetic domain wall in the above mentioned wire varies between 13 and 26 oersteds. The domain forming conductors should thus initially generate a field of about 30 oersteds for establishing the domain walls and then be reduced to approximately 6 oersteds for normal operation. The DC bias field may be selected at approximately 5.5 oersteds. The X and Y conductors may be provided so that each develops a half select field of approximately 6 oersteds so that at the combined word the DC bias field of 5.5 oersteds will be overcome to provide a net propagating field for reading of approximately 6.5 oersteds. The writing current in the sense and control conductors may provide a field of approximately 6 oersteds. For the arrangement in accordance with the invention in which one of the X or Y conductors also functions as the biasing conductor, a maintenance field of approximately 6 oersteds may be developed by current flowing through the Y selection conductor. For reading, the current may be terminated through a selected Y conductor and a 6 oersted field may be developed by a selected X conductor. It is to be noted that the above examples are only for purposes of illustration and other arrangements, field intensities and current values may be utilized in accordance with the principles of the invention.

Thus, there has been described a simplified and improved memory system in which binary information is stored by two stable positions for each bit element of each word position. The system provides coincident selection of a word element by applying unidirectional pulses to selected X and Y conductors and combining half amplitude fields at the selected word in only one coordinate direction. At unselected words of the energized X and Y conductors only the maintaining field is overcome and the domain wall remains in its stable position. In one arrangement in accordance with this invention substantially uniform fields are developed by utilizing adjacent conductors so that narrow tolerances in manufacture are not required. Also, in some arrangements in accordance with the invention, unidirectional selection pulses may be utilized of predetermined amplitudes and time durations so that non-destructive reading is provided.

What is claimed is:

1. An element for data storage comprising:

a storage medium, said medium including a magnetically oriented wire, said storage medium including at least one insulated conductor being wound in a substantially helical manner around said wire;

a first conductor being placed in a substantially normal juxtaposition and magnetically coupled to said storage medium, said first conductor being U-shaped; and a second conductor being placed in a substantially normal juxtaposition and magnetically coupled to said storage medium, said second conductor having a magnetic field therearound, said second conductor being substantially U-shaped and being interposed within the U-shape of said first conductor.

2. In the element as defined in claim 1 and further comprising:

means for maintaining opposing magnetic fields on said oriented wire to establish a domain cell therealong, said means being coupled to said first conductor; and means for applying a magnetic field to said second conductor to establish a domain wall in a predetermined position to establish a binary bit therein, said means being coupled to said second conductor.

3. A data storage system comprising:

a magnetic storage medium, said medium including a magnetically oriented wire, said storage medium having a sense means, said sense means including a plurality of insulated conductors being wound in a substantially helical manner around said wire;

a first conductor being placed in a substantially normal juxtaposition and magnetically coupled to said storage medium, said first conductor having a plurality of U-shaped outer loops; and a second conductor being placed in a substantially normal juxtaposition and magnetically coupled to said storage wire, said second conductor having a magnetic field therearound, said second conductor being shaped in a plurality of U-shaped inner loops, each of which is interposed between one U-shaped inner loop of said plurality of U-shaped outer loops of said first conductor for maintaining a magnetic state on said storage wire.

4. A data storage system comprising:

a magnetic storage medium, said medium including a magnetic storage wire, said storage medium having at least one insulated conductor being wound in a substantially helical manner around said storage wire;

a first conductor being placed in a substantially normal juxtaposition and magnetically coupled to said storage wire, said first conductor having a plurality of outer loops, each of which forms a domain cell for binary bit storage, said domain cell defining a first state, a second state and a neutral state; and a second conductor being placed in a substantially normal juxtaposition and magnetically coupled to said storage wire, said second conductor having a magnetic field therearound, said second conductor being shaped in a plurality of inner loops, each of which is interposed between one loop of said plurality of outer loops of said first conductor for maintaining a magnetic state on said storage wire and establishing said neutral position by the opposing magnetic fields of the inner loop of said second conductor.

5. A memory system comprising a plurality of magnetic wires positioned in a single plane to provide groups of adjacent bit storage segments having first and second end positions and a center position with each bit storage segment at each group having a movable magnetic domain wall therein, means positioned in said plane for applying biasing fields to each bit storage segment for moving said domain walls from a position adjacent to said center position to the adjacent first or second position, means positioned in said plane for applying reading fields to a selected group of bit storage elements for moving the domain walls to said center positions, means positioned in said plane for applying writing fields to the bit storage elements of a selected group for combining with said biasing fields to move the domain walls to selected second or third positions, and sensing means coupled to said groups of bit storage elements.

6. In a memory system having an elongated magnetic medium and a plurality of storage regions therealong each with a movable magnetic domain wall and with a bias field for moving said wall to a first or second end position when moved substantially close thereto and having a coil conductor adjacent to said medium, a combination comprising a plurality of first coordinate conductors each having a loop coupled to said medium for applying a first field to overcome the bias field, a plurality of second coordinate conductors each having a plurality of loops substantially parallel to the loops of said first conductors and coupled to said medium for applying a second field to propagate said domain wall to a central neutral position of the storage region, a first source of pulses coupled to said plurality of first coordinate conductors for applying pulses to a selected first conductor for developing said first field, and a second source of pulses coupled to said plurality of second coordinate conductors for applying pulses to a selected second conductor for developing said second field.

7. A memory system comprising a magnetic medium having a conductor wound therearound, means for forming a movable domain wall in a segment of said medium and establishing first and second end positions and a center position, said wall at said end positions being substantially stable, means for applying a maintaining field for maintaining said wall at said first or second end positions, a first conductor for applying a first reading field to said medium having a polarity for moving said wall toward said center position, a second conductor for applying a second reading field to said medium for combining with said first reading field to move said wall toward said center position, and means coupled to said first and second conductors for applying current pulses thereto for developing said first and second reading fields for a period of time so that said wall moves a portion of the distance to said center position and at the termination of said reading fields returns to said first or second end position, the conductor wound around said medium sensing an informational signal during the movement of said domain wall.

8. A memory system comprising first and second elongated magnetic mediums each having a conductor wound therearound, means for forming movable domain walls in adjacent segments of said mediums, said segments having first and second end positions and a center position, said walls at said center positions being substantially stable.

means for applying a maintaining field for maintaining said walls at said first or second end positions, a first conductor for applying a first reading field to said medium for moving the walls in adjacent segments of said mediums toward said center position, a second conductor for applying a second reading field to said medium for moving the walls in adjacent segments of said mediums toward said center position, and means coupled to said first and second conductors for developing current pulses so that said first and second reading fields are applied for a period of time such that the walls in adjacent segments move a portion of the distance to said center position to develop an informational signal in conductors wound around said medium and at the termination of said reading fields return to said first or second end position.

9. A memory system for non-destructive reading of stored binary information comprising a magnetic wire being magnetically oriented along the longitudinal axis thereof, domain forming means for establishing a domain wall in a segment of said wire, a conductor wound around said magnetic wire for sensing the movement of said domain wall during reading and for applying a writing field to move said wall from a central position of said segment to a selected first or second end position thereof, maintaining means for applying opposite polarity biasing fields to said segment for moving said wall from substantially at said central position to the first or second end positions, a first coordinate conductor having a loop adjacent to said wire for applying a first reading field thereto, a second coordinate conductor having a loop adjacent to said wire and substantially parallel to the loop of said first coordinate conductor for applying a second reading field to said wire, and means coupled to said first and second coordinate conductors for applying said first and second reading fields for a period selected to move said domain wall a portion of the distance to said central position so that said wall returns to the end position at the termination of said reading fields.

10. In a memory system having a plurality of substantially parallel magnetic wires each with a movable magnetic domain wall at each of a plurality of word positions, a conductor for maintaining said domain walls at first or second ends of the wires at each word position, and a plurality of conductors for sensing the movements of the domain wall and for applying a field to selectively move the walls from a central position to the first or second ends, a combination comprising a plurality of first coordinate conductors each forming a loop substantially at right angles to the wires at a selected number of word positions, a plurality of second cordinate conductors each forming a plurality of loops with each loop adjacent to a different one of a selected number of word positions and substantially at right angles to said wires, means for applying a unidirectional pulse of current through a selected one of said first coordinate conductors to develop a first selection field, and means for applying a unidirectional pulse of current through a selected one of said second coordinate conductors to develop a second selection field, said first and second selection fields combining at a predetermined word position to move the domain walls thereof to said central position.

11. A memory array for selection of word elements in X and Y coordinate directions comprising a plurality of first and second magnetic mediums each having a conductor wound therearound, a plurality of Y conductors coupled to said magnetic mediums, each forming a loop in the Y coordinate direction for developing a Y selection field, a plurality of X conductors coupled to said magnetic mediums, each having a plurality of loops with each loop adjacent and substantially parallel to a different Y conductor for forming an X selection field, a domain forming conductor having alternating segments adjacent to the Y and X conductors to form a domain wall in each of the storage lengths of said first and second magnetic mediums therebetween, said X and Y selection fields propagating said domain walls to a center position of the storage lengths adjacent to selected X and Y conductors, a maintaining conductor having a loop adjacent to the loop of each Y conductor for applying fields having polarities to propagate said magnetic walls from said center position to a selected position adjacent to one segment of said domain forming conductor, and means coupled to the conductors wound around said magnetic mediums for sensing signals developed by propagation of said magnetic walls to said center position and for applying fields to move said domain walls from said center position to a selected position adjacent to the segments of said domain forming conductor.

12. A memory system for selection in first and second coordinate directions comprising a plurality of magnetic wires having a magnetic orientation along the longitudinal axis thereof and positioned with the longitudinal axis of each wire substantially parallel to each other, a domain forming conductor having a plurality of segments in the first cordinate direction for establishing domain walls in a region between adjacent segments in each of said wires, the region between adjacent segments having a center position and a first and a second end position, a plurality of first coordinate conductors adjacent and orthogonal to said magnetic mediums and each having a loop positioned between a different pair of adjacent segments of said domain forming conductor, a plurality of second coordinate conductors each having a plurality of loops with each loop adjacent to a loop of said first coordinate conductor, a maintaining conductor having a plurality of loops with each loop adjacent to a different loop of said first coordinate conductors to develop a bias field for maintaining said domain walls at said first or second end positions of the corresponding regions, a plurality of conductor coils with a different one wound around each of said magnetic wires, a source of direct current coupled to said domain forming conductor for developing fields to maintain said domain walls, first and second sources of pulses coupled to said plurality of first and second coordinate conductors for applying pulses to propagate the domain walls from said first or second ends to a predetermined portion of the distance to said center position, a source of direct current coupled to said maintaining conductor for applying fields to said word positions to propagate said domain walls to said end positions, and sensing means coupled to said plurality of conductor coils.

13. A memory system for selection of word elements by a coincidence of fields developed by unidirectional pulses applied in a first and a second coordinate direction comprising a plurality of magnetic wires each having a conductor coil coupled thereto, a domain forming conductor having a plurality of adjacent segments coupled to said magnetic wires to establish word positions between adjacent segments thereof having a center position and two end positions, a plurality of first conductors for selection in a first coordinate each having a U-shaped loop positioned between and substantially parallel to a different pair of segments of said domain forming conductor, a plurality of second conductors for selection in a second coordinate each having a plurality of U-shaped loops adjacent to said first conductors and substantially parallel to said first conductors, a biasing conductor having a plurality of U-shaped loops each substantially coincident with a U-shaped loop of said first conductor, a source of direct current coupled to said domain forming conductor for establishing magnetic domain walls in said magnetic wires at each word position, first and second sources of pulses respectively coupled to said plurality of first conductors and to said plurality of second conductors, for applying pulses through a selected first conductor and a selected second conductor for moving said domain walls to the center of a selected word position for reading, a source of biasing current coupled to said biasing conductor for developing biasing fields having polarities for propagating the magnetic domain walls from the center position to a selected end position during writing, a source of writing pulses coupled to said conductor coils for developing fields to combine with said biasing fields to propagate said domain walls from the center position to selected end positions, and means coupled to said conductor coils for sensing the direction of movement of said domain walls.

14. A memory element for non-destructively interrogating a stored binary state comprising a magnetic medium, means for establishing a storage region along said medium with a magnetic domain wall thereat, said storage region having first and second end positions and a center position, means for applying a maintaining field to said medium having substantially equal magnetomotive force from said center position to said first and second end positions, means for applying a first reading field to said medium, means for applying a second reading field to said medium, said first and second fields in combination having a polarity and a time duration to move said domain wall a portion of the distance from said first or said second end positions to said center position, said maintaining field returning said domain wall to the first or second end position at the termination of said first and second fields, and means coupled to said medium for sensing the direction of movement of said domain wall.

15. A memory system addressable in first and second coordinate directions comprising a plurality of elongated magnetic mediums, a plurality of conductors with each coupled to a different one of said magnetic mediums, first means including conductor segments adjacent to said magnetic mediums for establishing word positions along said plurality of mediums with a domain wall in each medium at each word position, said word positions having first and second end positions and a center position, second means including conductor loops in the first coordinate direction for applying fields to each word position having a polarity to propagate said domain walls to said first or second end positions from respective first or second sides of said center position, third means including conductor loops in the first coordinate direction for applying a first field to a plurality of said word positions, fourth means including conductors each with a plurality of loops in the first coordinate direction for applying a second field to a plurality of said word positions, said first and second fields combining at a selected word position to propogate said domain walls to said center position, a source of writing pulses coupled to said plurality of conductors for selectively propagating said domain walls from the center position to said first or second end position, and sensing means coupled to said plurality of conductors for responding to said domain walls being propagated to said center position.

References Cited

UNITED STATES PATENTS 3,286,242 11/1966 Gianola ------------ 340—174

STANLEY M. URYNOWICZ, Jr., *Primary Examiner.*